US007093752B2

(12) United States Patent
Brusseaux et al.

(10) Patent No.: US 7,093,752 B2
(45) Date of Patent: Aug. 22, 2006

(54) METHOD AND DEVICE FOR ACCESS CONTROL TO EQUIPMENT BY MEANS OF A CONTACTLESS ACCESS PASS

(76) Inventors: Thierry Brusseaux, 2, rue des Tripétards, 25720 Aveney (FR); Franck Butterlin, 22, avenue de la 7eme Armée, Américaine, 25000 Besancon (FR)

(*) Notice: Subject to any disclaimer, the term of this patent is extended or adjusted under 35 U.S.C. 154(b) by 0 days.

(21) Appl. No.: 10/515,701

(22) PCT Filed: May 23, 2003

(86) PCT No.: PCT/FR03/01590

§ 371 (c)(1), (2), (4) Date: Jan. 24, 2005

(87) PCT Pub. No.: WO03/102877

PCT Pub. Date: Dec. 11, 2003

(65) Prior Publication Data

US 2005/0211769 A1 Sep. 29, 2005

(30) Foreign Application Priority Data

May 31, 2002 (FR) .................................. 02 06759

(51) Int. Cl.
*G06K 5/00* (2006.01)

(52) U.S. Cl. ...................................... 235/382; 235/384

(58) Field of Classification Search ................ 235/384, 235/382

See application file for complete search history.

(56) References Cited

U.S. PATENT DOCUMENTS 5,498,859 A 3/1996 Farmont .......................... 15/2

FOREIGN PATENT DOCUMENTS

| | | |
|---|---|---|
| DE | 2333563 | 2/1975 |
| EP | 0582098 | 7/1993 |
| EP | 0911762 | 4/1999 |

OTHER PUBLICATIONS

International Search Report dated Oct. 29, 2003.

*Primary Examiner*—Thien M. Le
*Assistant Examiner*—Kristy A. Haupt
(74) *Attorney, Agent, or Firm*—Sofer & Haroun LLP

(57) ABSTRACT

The invention relates to a method for access control to a first piece of equipment namely a closed vehicle parking lot, whereby the access to the entrance and exit is controlled by means of a contactless access card, characterized in comprising the following steps: a) distribution of said contactless pass at the entrance to the parking lot (1) to drivers not already possessing a pass and authorization of the appropriate vehicle (9) to enter the parking lot (1), b) writing in the memory of said contactless access pass (10) at the entrance to said parking lot (1), information relating to the entrance into the parking lot, c) reading said pass (10) on returning to the parking lot (1), determining the amount due for parking, carrying out the corresponding payment and issuing a receipt for payment and d) authorizing the exit of the appropriate vehicle at the exit to the parking lot (1) in response to the payment receipt.

10 Claims, 2 Drawing Sheets

METHOD AND DEVICE FOR ACCESS CONTROL TO EQUIPMENT BY MEANS OF A CONTACTLESS ACCESS PASS

RELATED APPLICATION

This application is a National Phase patent application of PCT Patent Application No. PCT/FR03/01590, which in turn claims priority to French Patent Application No. 02/06759, filed on May 31, 2002, the entirety of which are incorporated herein by reference.

The present invention relates to the control of access to a first equipment consisting of a motor vehicle parking lot with the aid of a contactless voucher. It further relates to the control of access to at least one second equipment of the transport (bus, metro, tram, etc.) and/or infrastructure (swimming pool, library, museum, etc.) type by means of the same contactless voucher.

Generally speaking, the control of access to a closed parking lot such as a multistorey car park whose entries and exits are controlled by barriers and the payment for parking when the latter is chargeable are relatively standard nowadays.

In public parking lots of the above kind that are open to all corners, a terminal at the entry of the parking lot issues each motorist a magnetic parking voucher carrying certain information such as the date and time of entry and possibly an identification number.

On taking the voucher, which commands opening of the entry barrier, the motorist can enter the parking lot and leave his vehicle there.

When the motorist returns to his vehicle and wishes to leave the parking lot, he must pay a parking charge.

To this end, he must go to an automatic payment point (or to a teller position in the case of manual payment), where he inserts his parking voucher and pays the amount determined from information contained in the voucher and read by an appropriate magnetic reader.

The voucher is re-encoded and returned to the motorist, who is then able to use it to command the opening of an exit barrier.

In certain cases, payment may be made directly at the exit terminal that commands opening of the exit barrier, especially in the case of payment by credit card.

Moreover, more and more closed parking lots are also adapted to enable the use of season tickets. Subscribers then receive parking cards of the contact or contactless type. These cards are generally issued to a named person and contain an identifier enabling the cardholder to be recognized. Presentation of this card at the entry and exit terminals allows access to the parking lot free of charge on days and between times covered by the card.

The different methods of payment, by vouchers for occasional users and by cards for users holding a season ticket, complicate the management of such public parking lots, making them less cost-effective.

It is additionally necessary to provide separate equipment for processing cards and vouchers.

The applicant has addressed the problem of simplifying the management of closed parking lots.

The present invention solves this problem.

The present invention relates to a method of control of access to a first equipment of the closed vehicle parking lot type, where access to the entrances and exits of the parking lot is controlled by means of a contactless access pass.

According to a general definition of the invention, the method comprises the following steps:

a) on entering the parking lot, issuing a contactless access pass to motorists who do not possess a pass already, and authorizing the associated vehicle to enter the parking lot, b) on entering the parking lot, writing information relating to entry into the parking lot into a memory of the contactless access pass;

c) on returning to the parking lot, reading the pass, determining the associated parking charge, making the corresponding payment, and issuing a receipt, and d) on leaving the parking lot, in response to the receipt, authorizing the associated vehicle to leave the parking lot.

Thanks to the invention, the use of a magnetic pass for occasional users is dispensed with, and replaced by the use of a contactless pass whose management is more reliable. Moreover, the method of the invention provides a flexible solution for holders of season tickets whose fixed charge has been exceeded or whose season ticket has expired, as they may then use their card at the payment terminals provided for occasional users.

The present invention also consists in an installation for implementing the method.

The installation comprises at least a first equipment comprising a closed vehicle parking lot comprising first means controlling access to the entrances and exits of the parking lot using a contactless access pass.

In practice, the first access control means comprise:

- at the entrance of the parking lot, contactless voucher dispensing means, processing means adapted to write in the memory of said contactless access pass information relating to entry into said parking lot, and authorization means adapted to authorize the associated vehicle to enter the parking lot, said processing means being adapted to read the pass presented by said user on returning to the parking lot, to determine the associated parking charge, and to issue a receipt in the event of payment of the corresponding amount, and
- at the exit from the parking lot, authorization means adapted, in response to the receipt, to authorize the associated vehicle to leave the parking lot.

In the field of transport, occasional users are issued individual passes or books of passes in the form of magnetic vouchers, whereas it is increasingly the case that contactless cards are issued to holders of a season ticket. This also has the result that the management of transport passes is relatively complex.

Moreover, in the field of transport, the management of reservations, validation and payment is also relatively complex.

This is because it is necessary to reserve a seat in order to travel on national or intercity rail and bus networks and national or international air transport networks.

In the case of urban and intercity networks requiring no reservation, the purchase of a ticket amounts to an authorization to use the transport network independently of the mode of transport and without reserving a seat.

Using different means of transport in succession, with or without reserving a seat, is also known.

Similarly, access to transport services is managed in different ways.

For example, in the case of closed transport networks with access control, validation of a pass is mandatory to access the transport network and exit from the network. On the other hand, in certain transport networks, access control including the obligatory validation of a pass enables access to the network but there is no access control at the exit.

Finally, there are also transport networks in which access is unrestricted but a pass requires validation or stamping at the exit.

Moreover, it is increasingly recommended that motorists should park their vehicles in parking lots and then use public transport.

The present invention goes hand in hand with this trend by proposing a method that includes the following steps, among others:

i) for the user, delivering on access to a parking lot a contactless pass that may be used in other equipments, for example on public transport;

ii) providing a second equipment, for example of the public transport type, access to which is controlled by means of a contactless access pass;

iii) in the event of use of the second equipment, writing information relating to said access to the second equipment into the contactless access pass that was used in the first equipment;

iv) on returning to the parking lot, reading the pass, determining and being paid the corresponding amount, and issuing a receipt;

v) on leaving the parking lot, in response to the receipt, authorizing the associated vehicle to leave the parking lot.

According to the invention, a method of the above kind provides not only management of a parking lot using a contactless technology but also total integration with other services and in particular transport services and unification and therefore generalization of the contactless access passes.

According to another feature of the invention, the method comprises a management step in which at least some services associated with said first and second equipments are managed in the first equipment.

Similarly, the present invention is aimed at an installation for implementing the method and including in particular a first equipment and at least one second equipment of the transport type comprising second contactless access control means comprising processing means adapted to write in a memory of a pass delivered by the first equipment information relating to said access to the second equipment, said processing means of the first equipment being adapted, when the user returns to the parking lot, to process the pass with the additional information relating to said access to the second equipment, to determine the charge for the corresponding service, and to issue a receipt for payment of the corresponding amount; on leaving the parking lot, the authorization means are adapted, in response to the receipt, to authorize the associated vehicle to leave the parking lot.

The first equipment preferably comprises a pay station comprising means for processing the content of the contactless access pass that are adapted to manage payment for at least some services associated with said first and second equipments.

The present invention is also aimed at an entry or exit terminal commanding the opening/closing of an entry or exit barrier of a closed parking lot.

Finally, the present invention also consists in a contactless pass for controlling access to an installation of the invention, the pass comprising a memory and processing means adapted to write information relating to contactless access to the installation in said memory.

Other features and advantages of the invention will become apparent in the light of the following detailed description of one embodiment of the invention, which is given by way of nonlimiting example and with reference to the appended drawings, in which.

Figure 1:
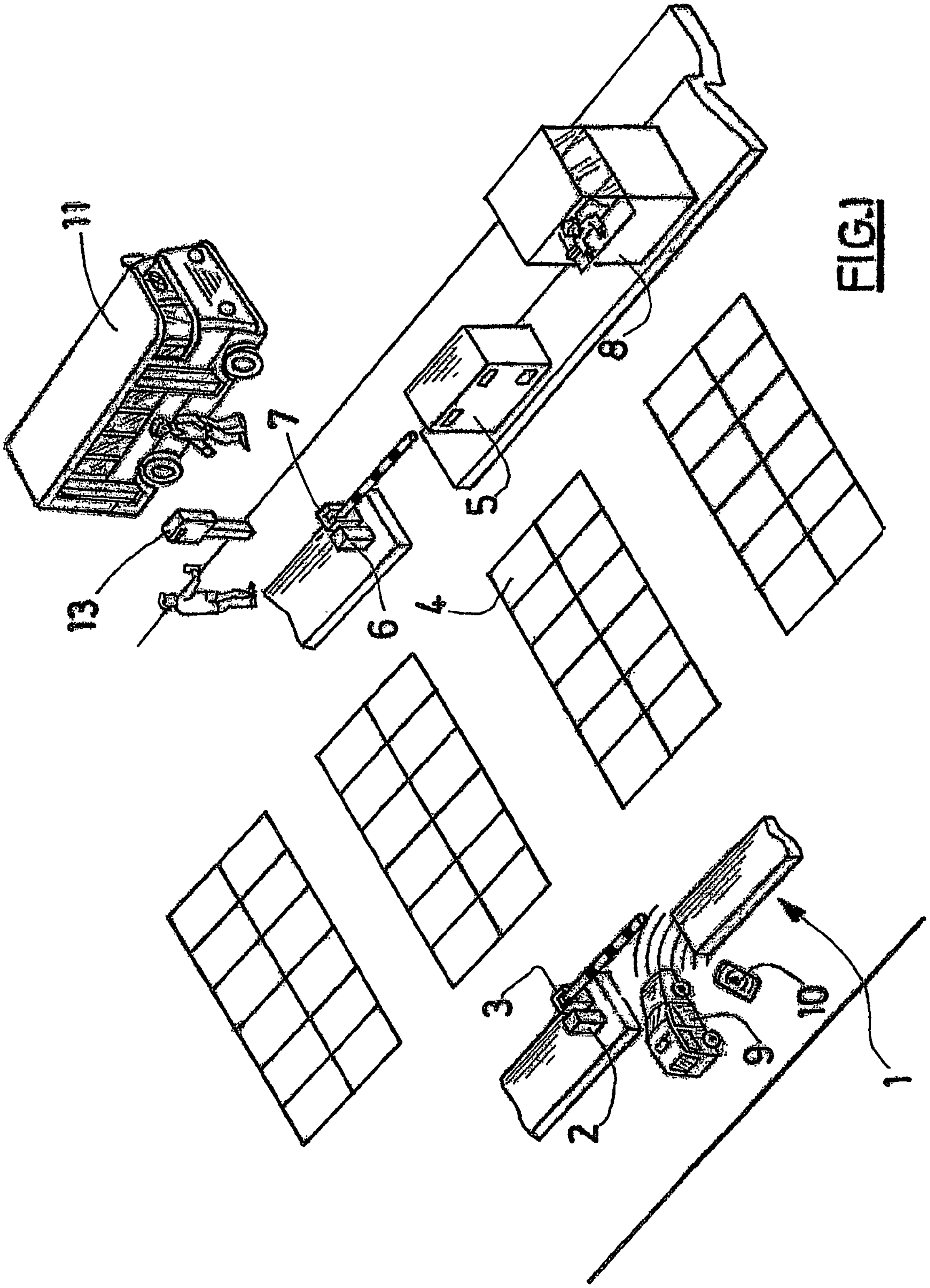
FIG. 1 is a diagram representing one embodiment of the method of the invention.

FIG. 1 shows a public motor vehicle parking lot 1 where parking has to be paid for. The parking lot 1, which is of the closed type, has at least one entrance equipped with an entry barrier 3, opening of which is commanded by a corresponding entry terminal 2.

The parking lot comprises at least one parking area in which different parking spaces 4 are marked out. An exit barrier 7, opening of which is commanded by a corresponding exit terminal 6, bars an exit.

Each motorist pays the parking charge at an automatic pay station 5, at a teller position 8 or directly at the exit terminal 6. The charge is conventionally calculated as a function of the actual parking time, which is determined from a parking voucher on which the time of arrival is recorded. The terminal 3 issues this voucher to the motorist when he enters the parking lot 1. When the charge has been paid at an automatic pay station 5 or at a teller position 8, the parking voucher is encoded accordingly and returned to the motorist, so that it may be read by the exit terminal to command opening of the exit barrier.

Of course, this kind of parking lot 1 is not limiting on the present invention. Thus, in a different embodiment of the invention, not shown, the barriers and their associated control terminals may be integrated into one and the same unit. Similarly, in a further embodiment, the entrance may also serve as an exit, the entry barrier then serving also as an exit barrier.

According to the invention, the various terminals (the terminals 2 and 6 and the automatic pay station or the teller position 8) use the “contactless” technique, as opposed to the “contact” technique, which necessitates the insertion of vouchers into appropriate readers.

Information is generally exchanged between each of the terminals and a contactless voucher by remote electromagnetic coupling between a first antenna in the contactless medium and a second antenna in the terminal. The voucher is additionally provided with an electromagnetic module comprising an antenna connected to an integrated circuit or microchip that includes a radio frequency portion, a memory in which information to be supplied to the terminal is stored, and logic functions for generating information to be transmitted and for processing information received.

The terminal 2 is therefore able to dispense contactless microchip card type vouchers, which are either disposable (made of cardboard), for occasional users in particular, or have a longer life (made of plastic), for example for more regular users of the parking lot.

According to the invention, on dispensing the voucher 10, the terminal 2 sends the memory of the microchip information relating to entry into said parking lot and authorizes the associated vehicle 9 to enter the parking lot. The terminal 2 may also print some or all of the same information on the body of the voucher.

In practice, the terminal 2 encodes and dispenses a pass 10 with information necessary for a later payment. For example, the information comprises date, time of entry, etc.

When the pass with the entry information has been dispensed, the control equipment 2 allows the vehicle to enter the parking lot by commanding opening of the barrier 3.

The motorist using the system of the invention may then park his vehicle in the parking lot.

On his return, the motorist pays the parking charge.

He may be offered various options: to pay on foot, before returning to his vehicle, at an automatic pay station 5 or at a teller position 8, or to pay at the exit terminal 6, from his vehicle.

In the case of payment at the automatic pay station 5 or at the manual teller position 8, in cash or by means of a bank card, the access pass 10 is re-encoded with the information necessary to authorize exit (including a receipt for payment of the correct parking charge).

The motorist may then return to his vehicle 9 and present his contactless pass 10 to the exit terminal 6, which processes the encoded information in the manner that is the norm in this art (for example, exit is authorized only within five minutes of payment), and authorizes the vehicle 9 to leave by commanding opening of the barrier 7.

In the case of direct payment at the exit terminal 6, without leaving his vehicle 9, the motorist presents his pass 10 to the exit terminal 6, which displays the amount to be paid.

The motorist may then pay the parking charge by inserting a bank card directly into the exit terminal 6 which, after validating the transaction and returning the card, authorizes the vehicle 9 to leave by commanding opening of the exit barrier 7.

In this context, the exit terminal 6 comprises a contactless card reader associated with a bank card reader and where applicable a printer for issuing a receipt for payment.

It should be noted that the solution proposed by the invention is suitable for retrofitting to prior art installations.

In the event of exceeding the contract amount or fixed charge, before leaving the parking lot according to the invention the excess charge may be paid at the various payment terminals and by the same method of payment used by occasional users.

This simplifies the management of any user, occasional or season ticket holder, thanks to the use of an installation based on the contactless technology.

Moreover, according to the invention, the parking lot managed by a system using entirely contactless technology further provides for real integration of this kind of access control system with associated other services, such as public services, and in particular public transport services, and thereby generalizes the use of a single contactless access pass serving at the same time as a parking voucher, a transport ticket or an entry ticket into a swimming pool or museum.

Figure 2:
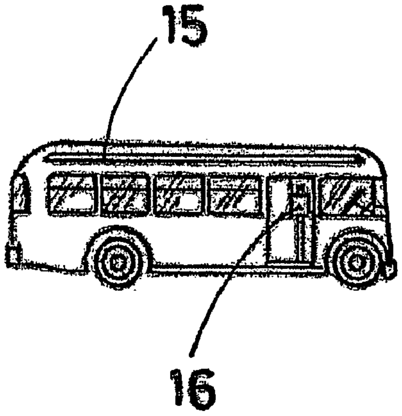
FIG. 2 is a diagram showing contactless access control to public transport of the bus type.
Figure 3:
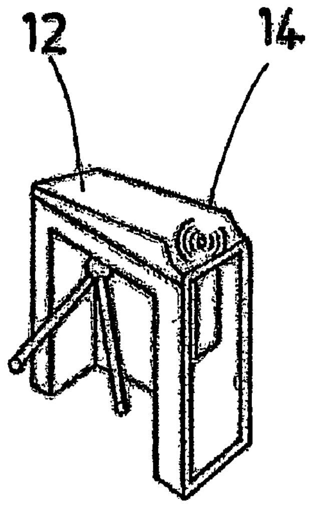
FIG. 3 shows diagrammatically contactless access control to public transport of the metro type.

Accordingly, if a user of the parking lot also wishes to use public transport to reach a chosen destination, he first parks his vehicle in the parking lot and then takes public transport of the tram 11 (FIG. 1), bus 15 (FIG. 2) or metro 12 (FIG. 3) type to a chosen destination.

These public transport means also have contactless access terminals able to encode the parking voucher 10 with information relating to the charge for such transport.

The returning user again uses public transport to return to the parking lot, again using his parking voucher as means of access. On reaching the parking lot, he pays not only his parking charge but also the public transport charge, and finally leaves the parking lot in his car.

Thanks to the invention, a single payment is sufficient for a plurality of services. It is to be noted that this kind of grouping of services enables the use of a dedicated combined charging structure. Thus use of the parking lot may entitle the user to reduced public transport charges and vice-versa.

According to the invention, the method of controlling access to the parking lot and to the various public transport means and other services accessed is managed entirely at the parking lot, both as regards the issuing of passes and final payment for the combined parking, transport, etc. services.

Of course, implementation of the invention necessitates the provision of the associated services with appropriate equipment for contactless reading and writing of the parking vouchers used by the parking lot 1. The equipment may comprise contactless bus validators 16 (FIG. 2), contactless metro turnstiles 14 (FIG. 3), or contactless platform validators 13 (FIG. 1).

Note that the user makes a post-payment for the associated services, i.e. he pays after using said services and also in another place. The risk of non-payment fraud is nevertheless limited. The user's vehicle, which remains parked in the parking lot, constitutes a "deposit" in relation to the operators of the various services used by the user.

The information necessary for post-payment is written in the pass by the control equipment.

For example, information of different kinds is in practice written successively into the memory of the pass, and this information may consist of network entry, exit, route, etc. information, for example. When the user returns to the parking lot, he leaves the parking lot in his car after paying the corresponding amount.

As indicated hereinabove, by presenting his pass, the user pays at an automatic pay station 5 or at a teller position 8, or makes the payment directly at the exit terminal 6.

In the event of payment at the automatic pay station or manual teller position, in cash or by card, the written information is read and the overall amount is calculated by the charging applications of the various services used.

In practice, the contactless pass is re-encoded with information necessary for authorizing exit.

The motorist may then return to his vehicle and present his contactless pass to the exit terminal, which processes the coded information in the manner that is the norm in the art (for example, exit is authorized only up to five minutes after payment), and authorizes exit of the vehicle by commanding opening of the barrier 7.

In the event of direct payment at the exit terminal 6, the motorist in his vehicle presents his pass at the exit terminal, which displays the amount to be paid calculated by applying the charges for the various services used.

The motorist can then pay for parking by inserting a bank card directly into the exit terminal 6, which validates the transaction, returns the bank card and authorizes the vehicle to leave by commanding opening of the corresponding exit barrier.

As indicated hereinabove, the exit terminal is limited to a contactless card reader with the option of a bank card reader and a printer for issuing a receipt for payment.

It should be noted that the method according to the invention does not necessitate centralized real time monitoring of the use of all access passes or interconnection of the various equipments and systems.

This is because the method of the invention is based on the use of a contactless pass or card whose content consists of information written successively by the control equipment of the various services used (parking lot entry terminals, bus validator, metro access turnstile, etc.).

The information is read and interpreted at the end for an overall payment according to an appropriate charging structure.

The information may be recorded for accounts processing with clearing based on real transport, parking and statistical usage (analysis of behavior, usage, transport, parking).

Other services may be associated with parking, for example systems or equipment managed by other organizations, such as libraries, swimming pools, museums, etc.

The invention claimed is:

1. Method of controlling access via a first equipment of the closed vehicle parking lot type, where access to entrances and exits of said parking lot is controlled by means of an access pass, and access via a second equipment where access to said second equipment may be controlled by means of an access pass, said method comprising the steps of:

a) issuing a contactless access pass upon entering the parking lot, to motorists who do not possess a pass already, and authorizing an associated vehicle to enter the parking lot;

b) writing information relating to entry into the parking lot into a memory of said contactless access pass upon entering the parking lot, wherein said writing is performed at a distance away from said first equipment;

c) controlling access to said second equipment in the event of use of said second equipment by means of said contactless access pass that was used in said first equipment, and writing in said pass, information relating to said access to said second equipment, wherein said writing is performed at a distance away from said second equipment;

d) reading the pass at a distance away from said first equipment, on returning to the parking lot, determining and receiving the amount corresponding to the services associated with said first and second equipments, and issuing a receipt; and e) authorizing the associated vehicle to leave the parking lot in response to the receipt.

2. Method according to claim 1, further comprising a management step in which at least some services associated with said first and second equipments are managed in said first equipment.

3. Installation of at least a first equipment having a closed vehicle parking lot with a first means controlling access to the entrances and exits of said parking lot using a contactless access pass and a second equipment having second contactless access control means with a processing means adapted to write in the memory of the pass that was used in the first equipment information relating to said access to the second equipment, the first and second access control means comprising:

contactless voucher dispensing means, at the entrance of the parking lot, processing means adapted to write in the memory of said contactless access pass information relating to entry into said parking lot, and authorization means adapted to authorize an associated vehicle to enter the parking lot, and authorization means at the exit from the parking lot;

said processing means of said first equipment being adapted, when the user returns to the parking lot, to read said pass at a distance from said processing means and process said pass with said information relating to entry into said parking lot and with said information relating to said access to said second equipment, to determine a charge for the corresponding services, and to issue a receipt in the event of payment of a corresponding amount, and at the exit from the parking lot, said authorization means being adapted, in response to said receipt, to authorize said associated vehicle to leave the parking lot.

4. Installation according to claim 3, wherein said first equipment comprises a pay station having means for processing the content of said contactless access pass that are adapted to manage payment for at least some services associated with said first and second equipments.

5. The installation as claimed in claim 3, further comprising an entry or exit terminal commanding the opening/closing of an entry or exit barrier of a closed parking lot.

6. Contactless access pass to an installation according to claim 3 further comprising a memory and where applicable processing means for said passes generated that are adapted to write in said memory information relating to contactless access to the installation.

7. The installation as claimed in claim 4, further comprising an entry or exit terminal commanding the opening/closing of an entry or exit barrier of a closed parking lot.

8. Contactless access pass to an installation according to claim 4 further comprising a memory and where applicable processing means for said passes generated that are adapted to write in said memory information relating to contactless access to the installation.

9. Method according to claim 1, wherein said second equipment is of the public transport type.

10. Installation according to claim 3, wherein said second equipment is of the public transport type.

* * * * *